United States Patent [19]
Eselun

[11] Patent Number: 5,526,114
[45] Date of Patent: Jun. 11, 1996

[54] TIME MULTIPLEXED FRINGE COUNTER

[76] Inventor: Steven A. Eselun, 1240 12th St., Los Osos, Calif. 93402

[21] Appl. No.: 277,739

[22] Filed: Jul. 20, 1994

[51] Int. Cl.$^6$ ........................................ G01B 9/02
[52] U.S. Cl. ................... 356/345; 356/356; 356/358; 250/237 G
[58] Field of Search ................... 356/345, 363, 356/356, 358; 250/237 G

[56] References Cited

U.S. PATENT DOCUMENTS

| | | |
|---|---|---|
| 3,644,046 | 2/1972 | Ryan ........................ 356/345 |
| 4,169,980 | 10/1979 | Zanoni . |
| 4,394,683 | 7/1983 | Liptay-Wagner et al. ............... 358/107 |
| 4,689,758 | 8/1987 | Carrenas ................... 356/356 |
| 4,696,574 | 9/1987 | Penney ..................... 356/375 |
| 4,744,663 | 5/1988 | Hamashima et al. ................... 356/375 |
| 4,785,181 | 11/1988 | Kimizuica et al. ................. 250/237 G |
| 4,836,681 | 6/1989 | Van Saders et al. .................... 356/374 |
| 4,884,697 | 12/1989 | Takacs . |
| 4,950,899 | 8/1990 | Tachibana ............................ 250/237 G |
| 4,982,080 | 1/1991 | Wilson et al. . |
| 4,990,765 | 2/1991 | Ondris . |
| 5,018,862 | 5/1991 | Aiello . |
| 5,165,045 | 11/1992 | Eselun . |
| 5,216,532 | 6/1993 | Taylor ..................................... 356/345 |
| 5,266,796 | 11/1993 | Learton . |
| 5,341,213 | 8/1994 | Giroux ..................................... 356/356 |

*Primary Examiner*—Samuel A. Turner
*Attorney, Agent, or Firm*—Robert Samuel Smith

[57] ABSTRACT

A method and apparatus for making measurements on light fringes such as are produced by interferometers or gratings wherein such measurements can include measurements of position and velocity of an object such as a step and repeat carriage or microscope stage The fringe pattern is sensed with a linear array detector whose elements are repetitively time multiplexed. The resultant output signal is filtered, yielding an AC signal with a phase indicative of fringe position. Rapid, digital, submicron counting is made possible using a phase lock loop to control the multiplexor clock. The advantages of AC interferometry are realized without optical modulation.

11 Claims, 2 Drawing Sheets

TIME MULTIPLEXED FRINGE COUNTER

BACKGROUND

1. Field of the Invention:

This invention relates to electro-optical techniques for electronically sensing the motion of interference fringes and particularly to a technique for converting a signal expressed as a spatial distribution of light intensity to a time dependent function.

2. Prior Art and Information Disclosure:

A number of methods are used for real time processing of interference light signals that produce fringe patterns.

It is well known to use polarization effects, modulation or heterodyning in laser interferometers for position measurement or in laser based optical linear or rotary encoders. The objective is to provide high speed, digital, directional counts that span more than one fringe with not more than one fringe resolution.

Generating quadrature signals using polarization is one method where different polarization states are manipulated such that two photo signals with a 90 degree phase difference are constructed. Here each beam is spatially integrated and two separate detectors are used to yield the two signals. This method requires several precision optical elements.

According to the phase or frequency technique, one beam path is modulated mechanically or electro-optically with respect to the other and the modulation in the interference pattern is processed. Only one photocell is required and polarization and polarization optics is not required but optical modulation must be achieved.

Optical heterodyning involves interfering two beams of slightly differing frequencies. The resultant signal as detected by one photoconductor will include an AC signal at the difference frequency. One can directionaly compare the phase of this signal with a reference, i.e., the signal used to split the laser frequency.

Directional counting involves at least two signals. With polarization, separate polarization states and two detectors are used. The other techniques mentioned use one spatially integrated photosignal but involve two separate frequencies.

U.S. Pat. No. 5,018,862 discloses a dual detector providing quadrature signals by aligning the detector elements with an interference fringe within a laser beam. A portion of the beam is spatially integrated to produce one electrical signal and another portion produces another signal in quadrature.

U.S. Pat. No. 4,990,765 discloses elements of a serial diode array purposely fed a linear current ramp allowing a means for addressing individual pixels U.S. Pat. No. 5,266,796 discloses an absolute rotary encoder wherein multiple beams diffracted from a rotating grating impinge on an array and grating angle is deduced from beam locations.

U.S. Pat. No. 4,884,697 discloses an interferogram imaged on a CCD with pixel data being fit to sinusoids and non sinusoids to give fringe positions. This is a computer based approach intended for static optics testing. It is not useful for measuring rapid fringe motions.

U.S. Pat. No. 4,982,080 discloses individual detector cell currents individually converted to frequencies all on one substrate. The single line device output is fed to a spectrum analyzer to address the cell elements.

U.S. Pat. No. 4,169,980 discloses a modulation method of analyzing an optical fringe pattern. The first and second derivatives of the signal from a single photocell are used to define the fringe center.

U.S. Pat. No. 4,884,697 discloses using both polarization and active optical phase shifting to sense displacement with an interferometer using two separate photocells.

U.S. Pat. No. 5,165,045 to Eselun discloses a collimated beam diffracted to produce a standing wavefront along a surface coincident with a surface that emits a signal in response to changes in intensity along the wavefront.

THE INVENTION

It is an object of this invention to measure position and movement of a base (in real time) by generating a light fringe pattern from a grating mounted on the base and using interference methods and measuring position and movement of the light fringes using a technique of this invention which does not require polarization nor modulation nor frequency shifting of any kind.

It is another object to realize the advantages of the AC type of interferometer but with minimal electro-optical requirements.

It is another object to perform high speed subfringe counting with insensitivity to background light or fringe contrast.

It is another object to develop an approach that can be used in any interferometer where fringe orientation and spacing remain fixed.

SUMMARY:

This invention is directed toward a method and apparatus for elecrto-optically sensing the motion of interference fringes generated by, e.g., interferometers or interference type encoders (referred to in this specification as a fringe generator). The apparatus includes a linear array of three or more photodetector elements which are illuminated by the fringe pattern. The signal generated by the elements of the array are repetitively time multiplexed i.e., the signal from each element is sensed in sequence so as to generate a time dependent signal.

The interference fringes and array of detectors are arranged such that the fringes move across the array of detectors as the grating or interferometer moves. The fringe spacing is set equal to the total array width. The time varying signal from the multiplexor. is passed through a band pass filter which rejects unwanted noise sources and harmonics so that the resultant signal is substantially sinusoidal. The phase of the sinusoid AC signal is compared to the phase of a reference signal which represents a reference position. Therefore, the motion of the fringe pattern on the array is converted to the phase of an AC signal.

In theory, the phase of the AC signal is sufficient to sense fringe motion. In practice however, as fringe motion becomes faster, the AC signal through the band pass filter becomes distorted and attenuated. In order to increase the dynamic performance, a phase lock loop is used to automatically adjust the multiplexor clock.

The output frequency of the band pass filter is a combination of the multiplox clock and the speed of fringe motion (grating motion). As the fringe speed increases, the frequency of the input clock is changed so that the output frequency is always constant and hence filterable by the band pass filter. If the fringes move in one direction, the multiplex rate is increased; if the fringes move in the opposite direction, the multiplex clock rate is decreased. When the fringes are motionless, the multiplex clock frequency equals the center frequency of the band pass filter.

Without the phase lock loop, the fringe motion results in a phase change of the band pass output. With the phase lock, fringe motion results in a phase change of the multiplexor clock. Now, however, much higher fringe speeds can be accurately followed and subfringe digital counting is simplified.

Figure 1:
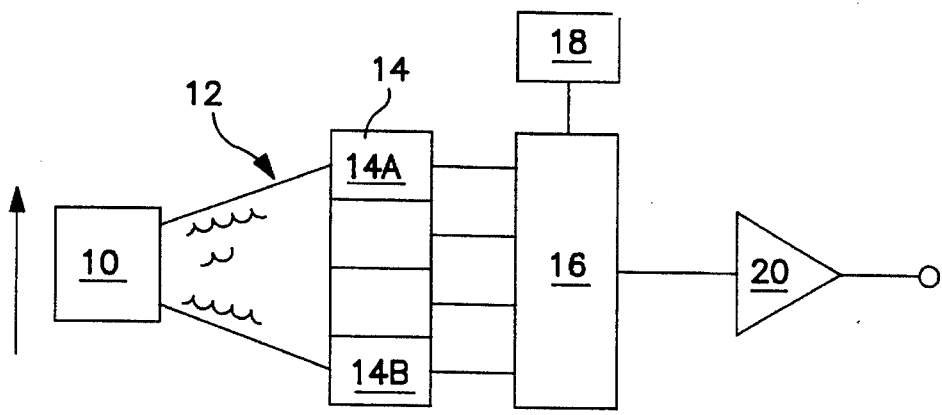
FIG. 1 shows a diagram of the system for converting a spatial pattern to a time signal.

DESCRIPTION OF A PREFERRED EMBODIMENT;

Turning now to a discussion of the drawings, FIG. 1 shows a schematic diagram of an embodiment of the invention for converting a fringe pattern to a time dependent signal.

Figure 2A:
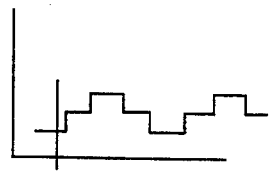
FIG. 2A and FIG. 2B show the signals generated by the schematic circuit of FIG. 1.
Figure 2B:
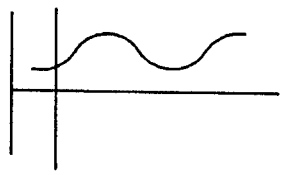

In the context of this specification, the expression "(light) fringes" is to be understood to mean the bands of light generated by interfering light beams such as with an interferometer or grating. Each fringe varies in intensity from a minimum intensity at the edges of the fringe to a maximum intensity at the center of the fringe. so that a pattern of light fringes has approximately a sinusoidal variation of intensity on the plane of projection of the fringe pattern. FIG. 1 shows a light fringe pattern traversing region 12 which has been generated by a source 10 which may be a grating, interferometer, etc. and impinges on a detector array 14. Four detectors in the array 14 are shown. In this illustration, one fringe spans all four detectors so that the intensity of light on the four detectors varies sinusoidally from the first detector 14a to the last detector 14b. The signals from the detectors are time multiplexed by multiplexor 16 at a rate determined by the multiplex clock 18. The signal from the multiplexor 16 at output terminal is shown in FIG. 2A to be a function of four discrete steps, each step originating from one of the detectors of array 14. The stepped signal is input to a band pass filter 20 whose output is shown in FIG. 2B to be a sinusoid so that the resultant wave generated at the output terminal of the band pass filter 20 is a sinusoidal function as shown in FIG. 2B.

Figures 3, 4:
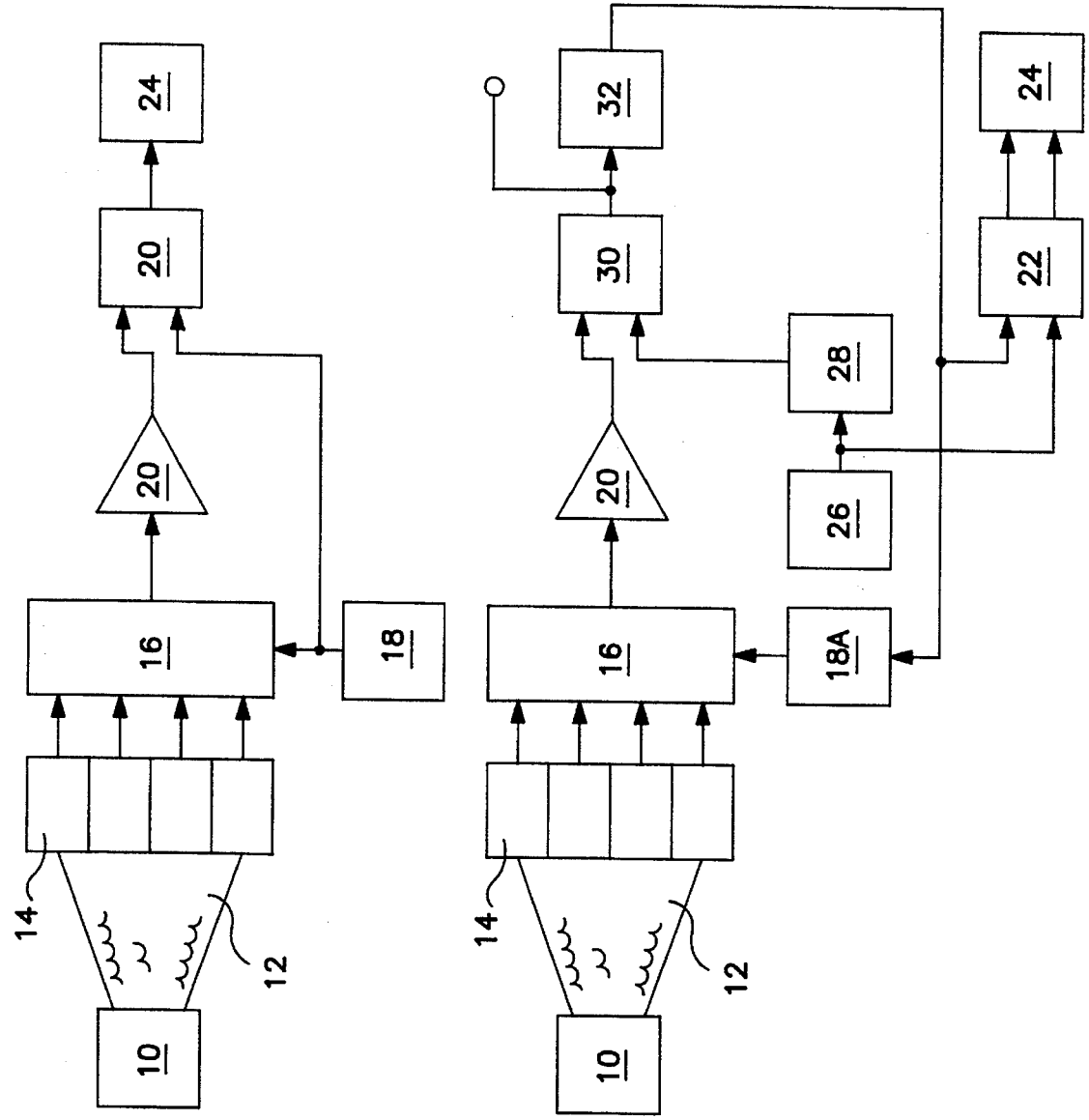
FIG. 3 shows an arrangement for measuring position.
FIG. 4 shows use of a phase locked loop to increase sensitivity of the measurement.

One application of the principles of the invention is to measure distance that a fringe generator (e.g., grating) moves. FIG. 3 is a schematic circuit illustrating this embodiment. There are shown the fringe pattern generator 10 generating the fringe pattern across region 12 incident on the array of detectors 14. Each detector in array 14 is connected to an input terminal of a multiplexor 16. Therefore, when the multiplexor is multiplexed, a multiplex signal is elicted at the output terminal of the multiplexor whose phase depends on the position of the fringe shining on the detctor array. The multiplexed signal is passed through a band pass filter 20 to one input terminal of a phase comparator 22. The other terminal of the phase comparator 22 is connected to the multiplexor clock 18 so that the signal output from the phase comparator 22 is a position signal which represents the position of the fringe on the array of detectors.

The position signal may used in numerous applications. In FIG. 3, it is used simply to indicate position of the fringe (or grating which produces the fringe.) In this application, output from the phase comparator 22 is input to a counter 24, which counts the number of phase revolutions or fraction thereof that are detected by the phase comparator corresponding to the number of fringes that have passed on the detector array 10.

FIG. 4 represents an extension of FIG. 3. The counter 24 of FIG. 3 may count directionally once per fringe. In order to count more times (n) per fringe and to extend the dynamic response, a phase lock loop is employed. The multiplexor clock rate is automatically changed so as to maintain a fixed frequency through the band pass filter 20.

The phase of the output of the bandpass filter 20 is given by:

$$\phi_1 = \frac{\phi_m}{p} + \delta$$

and $$\delta = \frac{2\pi x}{D}$$

where
x=the fringe position
D=width of the array detector 14 (one fringe spacing)
$\phi_m$=phase of the multiplexer clock pulses.
p=number of detector elements in the array The first phase comparator 30 provides an analog voltage which is proportional to the phase difference of its inputs, $\phi_1$ and $\phi_2$. Phase $\phi_2$, is the output of the first divider 28 which functions as "divide by n" counter. where "n" is the multiplying factor of the phase lock loop. Phase $\phi_2$ is given by:

$$\phi_2 = \frac{\phi_c}{m}$$

where $\phi_c$ is the phase output of the reference clock 26.

The voltage controlled oscillator 32 provides a frequency output proportional to the voltage input. Its phase is $\phi_{vco}$. This signal goes to a second divider 18A which functions as a "divide by n/p" counter The output phase of counter 18A is $\phi_m$ and is given by:

$$\phi_m = P\phi_{vco}/m$$

The second phase detector 22 as before outputs up and down pulses when the inputs change phase by 2 Π.

In the lock condition, the phase inputs $\phi_1$ and $\phi_2$ to the phase comparator 30 are equal to each other, i.e., $\phi_1=\phi_2$. (They are phase locked ) Combining $\phi_1$ and $\phi_2$ gives:

$$\phi_{vco}=\phi_c-m\delta$$

Therefore the phase sensitivity to fringe position has been increased by n. When this phase is compared to the reference clock phase, $\phi_c$, by the phase comparator 22, up and down pulses will occur. Whenever changes by 2π/n, or, in other words, when the fringe moves a distance D/n, these pulses are directionally counted by the counter 24.

In addition, the analog input to the voltage controlled oscillator 32 is proportional to the velocity of the fringe motion. For example, this can be a useful signal in motion control systems where the fringe motion is related to the movement of an item. The output of the counter is then proportional to the position of the item.

Other benefits of this technique are that fringe position is insensitive to fringe contrast and DC background light levels. Fringe contrast affects the amplitude of the sine wave output of the band pass filter 20 but only zero crossings are sensed by the phase detector 30 so that amplitude changes have no effect. Likewise, DC light levels received by the multiplexor 16 are rejected by the band pass filter 20.

Other variations and applications of the principles of the invention are suggested by reading the specification and studying the drawings which are within the scope of the invention.

For example, the position signal generated at the second phase comparator 22 in FIG. 4 could be used to drive other circuits in process applications or it may simply be displayed by an up and down counter as shown in FIG. 4.

Figure 5:
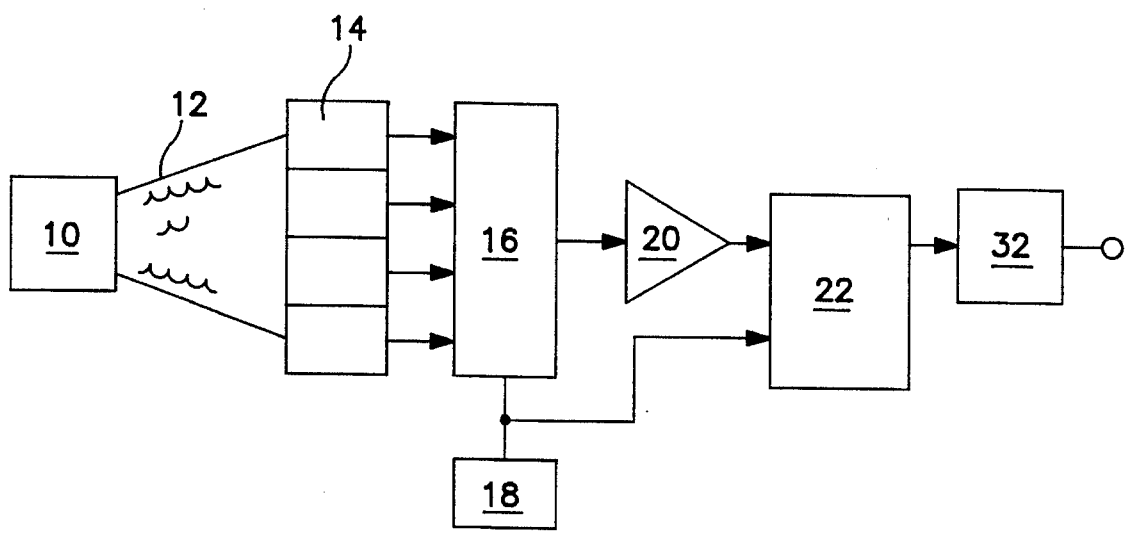
FIG. 5 shows an arrangement for measuring velocity of a fringe generator.

FIG. 5 shows the addition of a differentiator 32 to the position detection circuit of FIG. 3. Differentiating the position signal from phase comparator 22 by differentiator 34 gives the velocity of the fringes.

I therefore wish to define the scope of my invention by the appended claims.

I claim:

1. An apparatus for converting a light pattern having a spatially distributed intensity to a time dependent signal which comprises:

an array of a plurality of photodetectors positioned to intercept said light pattern;

a multiplexor means for generating a plurality of signals responsive to intensity of said light pattern at each photodetector having a plurality of input terminals, one said input terminal connected to one of said plurality of detectors, respectively;

a multiplexor clock means for transferring successively and repeatedly each one of said plurality of signals at each input terminal of said multiplexor means to an output terminal of said multiplexor means;

said multiplexor clock means being operably connected to said multiplexor means;

a band pass filter having a center frequency substantially equal to a frequency of said multiplexor clock means divided by a number equal to said plurality of detectors, said band pass filter having an input terminal connected to said output terminal of said multiplexor means and an output terminal where said time dependent signal is elicited.

2. An apparatus for generating a position signal responsive to a position of an object which comprises:

means attached to said object for producing a pattern of light fringes;

an array of a plurality of photodetectors positioned to intercept said pattern of light fringes;

a multiplexor means for generating a plurality of signals responsive to intensity of said pattern at each photodetector having a plurality of input terminals, one said input terminal connected to one of said plurality of detectors, respectively;

a multiplexor clock means for transferring successively and repeatedly each one of said plurality of signals at each input terminal of said multiplexor means to an output terminal of said multiplexor means;

said multiplexor clock means being operably connected to a clock terminal of said multiplexor means;

a band pass filter having a center frequency substantially equal to a frequency of said multiplexor clock means divided by a number equal to said plurality of detectors, said band pass filter having an input terminal connected to said output terminal of said multiplexor means and an output terminal where said time dependent signal is elicited;

a phase comparator having one input terminal connected to said output terminal of said filter and another input terminal connected to said multuplexor clock means such that a phase difference signal is generated at an output terminal of said phase comparator responsive to a position of said object.

3. A device as in claim 2 which comprises means for displaying said phase difference signal.

4. A device as in claim 2 which comprises means for differentiating said phase difference signal with respect to time such as to produce a velocity signal responsive to a velocity of said object.

5. An apparatus for generating a position signal responsive to a position of an object which comprises:

means adapted to be attached to said object for producing a pattern of light fringes;

an array of a plurality of photodetectors positioned to intercept said pattern;

a multiplexor having a multiplexor clock terminal, an output terminal and a plurality of input terminals, one said input terminal connected to one of said plurality of detectors, respectively;

a reference clock means for emitting a signal having a reference clock frequency and reference clock phase;

a first divider means connected to said reference clock means for generating a timing clock signal having a timing clock frequency equal to said reference clock frequency divided by a selected first integer;

a band pass filter having a center frequency substantially equal to said timing clock frequency;

said band pass filter having an input terminal connected to said output terminal of said multiplexor such that a filtered multiplexor signal is generated at an output terminal of said band pass filter having a multiplexor signal phase responsive to a position of said pattern of light fringes on said array of photodetectors;

a first phase comparator means having one input terminal connected to an output terminal of said filter and another input terminal connected to an output terminal; of said first divider for generating a phase difference signal at an output terminal of said first phase comparator means;

a voltage controlled oscillator means having an input terminal connected to said output terminal of said first phase comparator for generating a voltage controlled oscillator signal having a phase difference clock frequency proportional to said phase difference signal;

a second divider means connected to an output terminal of said voltage controlled oscillator means for generating a muktiplexor clock signal having a multiplexer clock frequency equal to said phase difference clock frequency divided by a second integer;

said second integer being equal to said first integer divided by said plurality;

said multiplexer clock terminal being connected to an output terminal of said second divider means;

a second phase comparator means having one input terminal connected to said output terminal of said voltage controlled oscillator means and a second input teriminal connected to said output terminal of said reference clock means for generating said position signal being responsive to a difference in phase between signals applied at said first and second input terminals of said second phase comparator means where by a displacement signal is generated at an output terminal of said second phase comparator means which is proportional to a displacement of said fringe pattern multiplied by said first integer;

said first integer selected to provide a desired sensitivity to changes of said displacement.

6. An apparatus as in claim 5 which comprises a means for displaying said position signal connected to said output terminal of said second phase comparator.

7. An apparatus as in claim 6 wherein said means for displaying comprises an up and down counter means having an input terminal connected to an output terminal of said second phase comparator means.

8. A method for converting a spatially dependent light pattern to a time dependent signal which comprises the steps:
   (a) shining said light pattern on a linear array of detectors such as to generate a series of signals, one signal from each detector;
   (b) passing said series of signals successively and repeatedly at a frequency of a clock signal through a band pass filter such as to produce a continuous time dependent signal having a time varying amplitude corresponding to an intensity of said light pattern at each one of said detectors in succession such that a phase of said time dependent signal depends on spatial distribution of intensity of said pattern;
   (c) determining a difference signal being a difference in phase between said time dependent signal and said clock signal;
   (d) displaying said difference signal such as to indicate a position of said pattern on said array of detectors.

9. A method as in claim 8 wherein said filter is a band pass filter having a center frequency equal to said clock frequency.

10. A method as in claim 8 wherein step (b) includes the steps;
    (i) connecting each inputm terminal of a multiplexor to one of said detectors, respectively;
    (ii) connecting an output terminal of said multiplexor to an input terminal of said band pass filter;
    (iii) applying a clock signal having said frequency to a clock terminal of said multiplexor.

11. A method as in claim 8 wherein step (b) includes the steps
    (i) connecting each input terminal of a multiplexor to one of said detectors, respectively;
    (ii) connecting an output terminal of said multiplexor to an input terminal of said bandpass filter so as to generate a filtered multiplexor signal at an output terminal of said band pass filter when a multiplexor clock terminal is connected to a clock signal;
    (iii) connecting said multiplexor clock terminal of said multiplexor to a clock output terminal of a phase locked loop having a reference clock generating a reference signal;
    (iv) connecting an output terminal of said band pass filter to an input terminal of said phase lock loop;
    and, step (c) includes the step:
    measuring the phase difference between said multiplexor signal and said reference signal being said difference signal.

* * * * *